US012575510B2

(12) United States Patent
Brouwer et al.

(10) Patent No.: US 12,575,510 B2
(45) Date of Patent: Mar. 17, 2026

(54) SOD HARVESTING SYSTEMS AND RELATED METHODS

(71) Applicant: 1045929 Ontario Limited, Keswick (CA)

(72) Inventors: Gerardus J. Brouwer, Keswick (CA); Robert Milwain, Keswick (CA); Ian L. Morgan, Cambridge (CA)

(73) Assignee: 1045929 Ontario Limited, Keswick (CA)

( * ) Notice: Subject to any disclaimer, the term of this patent is extended or adjusted under 35 U.S.C. 154(b) by 717 days.

(21) Appl. No.: 17/979,820

(22) Filed: Nov. 3, 2022

(65) Prior Publication Data

US 2023/0157224 A1 May 25, 2023

Related U.S. Application Data

(60) Provisional application No. 63/281,891, filed on Nov. 22, 2021.

(51) Int. Cl.
*A01G 20/15* (2018.01)
*B65G 57/03* (2006.01)
*B65G 57/24* (2006.01)
*B65G 65/34* (2006.01)

(52) U.S. Cl.
CPC ............. *A01G 20/15* (2018.02); *B65G 57/03* (2013.01); *B65G 57/24* (2013.01); *B65G 65/34* (2013.01); *B65G 2201/0267* (2013.01)

(58) Field of Classification Search
CPC ...... B65G 57/24; B65G 57/245; B65G 57/22; B65G 57/03; B65G 65/34; B65G 2201/0267; A01G 20/15
See application file for complete search history.

(56) References Cited

U.S. PATENT DOCUMENTS

| | | | | |
|---|---|---|---|---|
| 3,887,013 | A | * | 6/1975 | Helberg ............... B65G 57/245 |
| | | | | 172/20 |
| 4,294,316 | A | * | 10/1981 | Hedley .................. A01G 20/15 |
| | | | | 172/20 |
| 7,641,437 | B1 | | 1/2010 | Tvetene et al. |
| 9,078,390 | B2 | * | 7/2015 | Aposhian ............... A01G 20/15 |
| 9,363,937 | B2 | * | 6/2016 | Aposhian ............... B65B 5/105 |

(Continued)

OTHER PUBLICATIONS

NPL 1 : Firefly Proslab 155B with Double Stacker, uploaded on Feb. 14, 2018 by user FireFlyAutomatix (Cited originally by Third-Party Submission). Total of nine (9) screen shots at 1 second, 19 seconds, 26 seconds, 42 seconds, 43 seconds, 44 seconds, 45 seconds, 46 seconds, and 52 seconds. (Year: 2018).*

(Continued)

*Primary Examiner* — Lynn E Schwenning

(57) ABSTRACT

A method of operating a stacking head of a sod harvester includes: (a) repeatedly transferring sod slabs from a transfer station located along a conveyor assembly of the sod harvester to a pallet station of the sod harvester to form a loaded pallet at the pallet station; (b) during replacement of the loaded pallet with an empty pallet, forming a stack of slabs at the transfer station; and (c) transferring the stack of slabs from the transfer station to the pallet station for deposit on the empty pallet when received at the pallet station, and repeating (a) to (c) in a continuous sod harvesting process.

27 Claims, 10 Drawing Sheets

(56) References Cited

U.S. PATENT DOCUMENTS

| | | | | |
|---|---|---|---|---|
| 9,894,824 B2 * | 2/2018 | Aposhian | ............... | A01G 20/15 |
| 10,111,372 B2 † | 10/2018 | Aposhian | | |
| 2013/0259629 A1 | 10/2013 | Aposhian et al. | | |
| 2017/0367270 A1 * | 12/2017 | Brouwer | ............... | B65G 57/26 |

OTHER PUBLICATIONS

Screen captures from YouTube video clip entitled FireFly ProSlab 155B with Double Stacker, 3 pages, uploaded on Feb. 14, 2018 by user FireFlyAutomatix. Retrieved from Internet: https://www.youtube.com/watch?v=zHXIp54-hDY.†

Screen captures from YouTube video clip entitled The New FireFly Fleet—ProSlab 155B with Double Stack and M220 Mower, 1 page, uploaded on Feb. 14, 2018 by user FireFlyAutomatix. Retrieved from Internet: https://www.youtube.com/watch?v=jbg99CfPd2Y.†

* cited by examiner
† cited by third party

SOD HARVESTING SYSTEMS AND RELATED METHODS

CROSS-REFERENCE TO RELATED APPLICATIONS

The present application claims the benefit of priority from U.S. Provisional Application No. 63/281,891 filed Nov. 22, 2021, which is hereby incorporated herein by reference in its entirety.

FIELD

The specification relates generally to sod harvesting.

BACKGROUND

Sod harvesters typically operate by undercutting and chopping sod into slabs, transporting the slabs along a conveyor of the harvester, and transferring the slabs onto a pallet. When a pallet is sufficiently loaded with slabs, the loaded pallet is discharged from the sod harvester and replaced with an empty pallet for continued stacking of slabs. The discharged pallet can be transported to a location where the sod is to be stored, sold, or laid.

SUMMARY

The following summary is intended to introduce the reader to various aspects of the applicant's teaching, but not to define any invention.

According to some aspects, a method of operating a sod harvester includes: (a) cutting sod slabs from the ground using a cutting assembly; (b) advancing the slabs along a conveyor assembly from the cutting head to a transfer station located along the conveyor assembly; (c) repeatedly transferring the slabs from the transfer station to a pallet station spaced apart from the transfer station using a stacking head to form a loaded pallet at the pallet station; (d) replacing the loaded pallet at the pallet station with an empty pallet; (e) during the replacing step, forming a stack of the slabs at the transfer station using the stacking head; (f) transferring the stack of slabs using the stacking head from the transfer station to the pallet station to deposit the stack onto the empty pallet when received at the pallet station; and (g) repeating (a) to (g) in a continuous sod harvesting process.

In some examples, step (c) includes transferring a single layer of one or more slabs during at least some of the trips of the stacking head from the transfer station to the pallet station.

In some examples, the replacing step includes discharging the loaded pallet from the pallet station onto the ground and injecting the empty pallet from a pallet loader to the pallet station.

In some examples, the discharging step includes lowering the loaded pallet into engagement with the ground.

In some examples, forming the stack includes holding a leading slab above the conveyor assembly using the stacking head, advancing a trailing slab along the conveyor assembly under the leading slab, and positioning the leading slab atop the trailing slab.

In some examples, forming the stack includes lifting a conveyor supporting the leading slab at the transfer station toward the stacking head and picking up the leading slab off the conveyor using the stacking head.

In some examples, picking up the leading slab includes advancing hooks of the stacking head to pierce the leading slab with the hooks.

In some examples, forming the stack includes lowering the conveyor away from the leading slab when picked up by the stacking head and advancing the trailing slab along the conveyor under the leading slab.

In some examples, forming the stack includes releasing the leading slab onto the trailing slab.

In some examples, releasing the leading slab includes withdrawing hooks of the stacking head from the leading slab.

In some examples, transferring the stack includes picking up the stack from the transfer station by the stacking head, transporting the stack from the transfer station to the pallet station through translation of the stacking head, and depositing the stack at the pallet station.

In some examples, the conveyor is lifted toward the stacking head to raise the stack for pick up by the stacking head.

In some examples, picking up the stack includes advancing hooks of the stacking head through both the leading and trailing slabs and depositing the stack includes withdrawing the hooks from both the leading and trailing slabs.

In some examples, the stacking head transfers at least one complete slab layer in each trip of the stacking head from the transfer station to the pallet station.

In some examples, each pallet has a pallet area over which slabs are stackable, and each slab layer transferred from the transfer station to the pallet station by the stacking head has a slab layer area corresponding in size to the pallet area for stacking at least one complete slab layer over the pallet area during each trip of the stacking head from the transfer station to the pallet station.

In some examples, the pallet area is defined by a pallet width and a pallet length, and each of the pallet width and the pallet length is between about 35 inches and 50 inches.

In some examples, the slab layer area is defined by a slab layer width and a slab layer length, and each of the slab layer width and the slab layer length is between about 35 inches and 50 inches.

According to some aspects, a method of operating a stacking head of a sod harvester includes: (a) repeatedly transferring sod slabs from a transfer station located along a conveyor assembly of the sod harvester to a pallet station of the sod harvester to form a loaded pallet at the pallet station; (b) during replacement of the loaded pallet with an empty pallet, forming a stack of slabs at the transfer station; and (c) transferring the stack of slabs from the transfer station to the pallet station for deposit on the empty pallet when received at the pallet station, and repeating (a) to (c) in a continuous sod harvesting process.

According to some aspects, a sod harvesting system includes: (a) a harvester frame; (b) a cutting assembly mounted to the harvester frame for cutting sod into slabs; (c) a conveyor assembly supported by the harvester frame for transporting the slabs away from the cutting assembly toward a transfer station located along the conveyor assembly; (d) a pallet station supported by the harvester frame and spaced apart from the transfer station, the pallet station operable to hold a pallet for loading with slabs and to discharge the pallet when loaded; (e) a pallet loader supported by the harvester frame for holding a plurality of empty pallets, the pallet loader operable to inject empty pallets one at a time to the pallet station; (f) a stacking head movably mounted to the harvester frame, the stacking head moveable between a pick up position above the conveyor assembly for picking up one or more slabs from the transfer station, and a drop off position above the pallet station for depositing the one or more slabs on a pallet at the pallet station; and (g) a control system configured to control operation of the stacking head to: (i) repeatedly transfer slabs from the transfer station to the pallet station to form a loaded pallet at the pallet station; (ii) during replacement of the loaded pallet with an empty pallet, form a stack of slabs at the transfer station; and (iii) transfer the stack of slabs from the transfer station to the pallet station for deposit on the empty pallet when received at the pallet station, and repeat (i) to (iii) in a continuous sod harvesting process.

According to some aspects, a method of operating a stacking head of a sod harvester includes: (a) operating the stacking head in a single layer mode, in which the stacking head transfers a single layer of one or more sod slabs during each trip from a transfer station located along a conveyor assembly of the sod harvester to a pallet station of the sod harvester for deposit of the single layer onto a pallet at the pallet station; and (b) switching operation of the stacking head from the single layer mode to a pre-stacking mode based on operating conditions of the sod harvester, the stacking head configured to form a stack of slabs at the transfer station and transfer the stack to the pallet station when operating in the pre-stacking mode.

According to some aspects, a method of operating a sod harvester includes: (a) cutting sod slabs from the ground using a cutting assembly; (b) advancing the slabs along a conveyor assembly from the cutting head to a transfer station located along the conveyor assembly; (c) forming a stack of the slabs at the transfer station using a stacking head; and (d) transferring the stack of slabs using the stacking head from the transfer station to a pallet station to deposit the stack onto a pallet at the pallet station.

In some examples, forming the stack includes holding a leading slab above the conveyor assembly using the stacking head, advancing a trailing slab along the conveyor assembly under the leading slab, and positioning the leading slab atop the trailing slab.

In some examples, forming the stack includes lifting a conveyor supporting the leading slab at the transfer station toward the stacking head for pick up of the leading slab by the stacking head, lowering the conveyor away from the leading slab held by the stacking head to advance the trailing slab along the conveyor under the leading slab, and releasing the leading slab onto the trailing slab.

In some examples, forming the stack includes advancing hooks of the stacking head through the leading slab to pick up the leading slab, and withdrawing the hooks from the leading slab to release the leading slab onto the trailing slab.

In some examples, transferring the stack includes advancing the hooks through both the leading and trailing slabs at the transfer station, transporting the stack to the pallet station using the stacking head, and withdrawing the hooks from the leading and trailing slabs at the pallet station.

In some examples, each stack includes at least two complete slab layers for stacking on the pallet.

In some examples, each pallet has a pallet area over which slabs are stackable, and each slab layer in the stack has a slab layer area corresponding in size to the pallet area for stacking at least two complete slab layers over the pallet area during transfer of each stack by the stacking head from the transfer station to the pallet station.

In some examples, the pallet area is defined by a pallet width and a pallet length, and each of the pallet width and the pallet length is between about 35 inches and 50 inches.

In some examples, the slab layer area is defined by a slab layer width and a slab layer length, and each of the slab layer width and the slab layer length is between about 35 inches and 50 inches.

BRIEF DESCRIPTION OF THE DRAWINGS

The drawings included herewith are for illustrating various examples of systems, methods, and apparatuses of the present specification and are not intended to limit the scope of what is taught in any way. In the drawings.

DETAILED DESCRIPTION

Various systems, apparatuses, or processes will be described below to provide an example of an embodiment of each claimed invention. No embodiment described below limits any claimed invention and any claimed invention may cover systems, processes, or apparatuses that differ from those described below. The claimed inventions are not limited to systems, apparatuses, or processes having all of the features of any one system, apparatus, or process described below or to features common to multiple or all of the systems, apparatuses, or processes described below. It is possible that a system, apparatus, or process described below is not an embodiment of any claimed invention. Any invention disclosed in a system, apparatus, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

Sod harvesters operate to cut sod into slabs. The slabs are transported along a conveyor assembly, and a stacking head picks up a layer of slabs and transports the slabs from the conveyor assembly to a pallet. The process is repeated until the pallet is sufficiently loaded with slabs. The loaded pallet is then replaced with an empty pallet for continued stacking of slabs. In some cases, replacement of the loaded pallet with an empty pallet may require slowing of the harvesting process until the empty pallet is in position for receiving slabs.

The present specification discloses aspects of sod harvesting systems and methods that can help maintain a higher harvesting rate during pallet replacement relative to some existing systems. According to some aspects of the present disclosure, during replacement of a loaded pallet with an empty pallet, the stacking head is operated in a pre-stacking mode to form a stack of slabs over the conveyor assembly and deposit the stack onto the empty pallet received at the pallet station. The same stacking head can be used for both forming the stack of slabs and transferring the stack to the pallet. In some examples, after depositing the stack, the stacking head can resume transferring single layers of slabs from the conveyor to the pallet to form another loaded pallet, at which point the pallet replacement and pre-stacking process is repeated. As used herein, the term "loaded" pallet means that the pallet has received a plurality of slab layers sufficient in number to warrant discharge of the pallet from the pallet station (e.g. for replacement with an empty pallet). For further clarity, a "loaded" pallet may be loaded with slabs to only a small percentage of its maximum slab carrying capacity, and may be capable of receiving additional slab layers.

Figures 1, 1A:
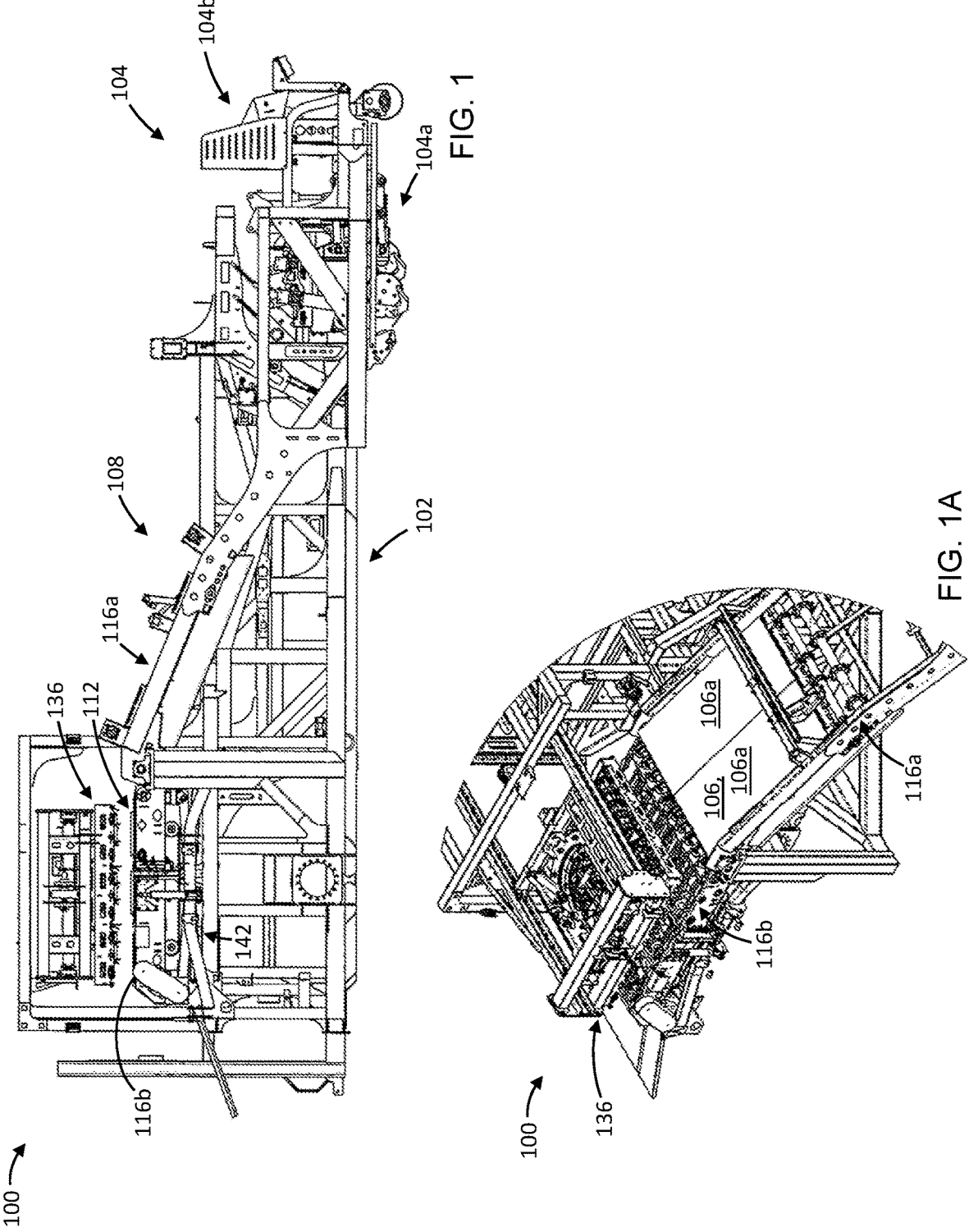
FIG. 1 is an elevation view of portions of an example sod harvester.
FIG. 1A is a perspective view of a portion of the sod harvester of FIG. 1.

Referring to FIG. 1, an example sod harvester 100 for harvesting sod is illustrated. The sod harvester 100 includes a harvester frame 102 and a cutting assembly 104 mounted to the harvester frame 102 for cutting sod into slabs 106 (FIG. 1A). In the example illustrated, the cutting assembly 104 has a plurality of cutting heads 104a (two cutting heads arranged side-by-side, in the example illustrated) for stripping corresponding sod strips from the ground, and a plurality of corresponding cut-off mechanisms 104b (two cut-off mechanisms arranged side-by-side, in the example illustrated) for cross-cutting the sod strips to a desired length to form the slabs 106.

The sod harvester 100 includes a conveyor assembly 108 having a plurality of conveyors supported by the harvester frame 102. In the example illustrated, the conveyor assembly 108 is operable to receive slabs from the cutting assembly 104, and to transport the slabs away from the cutting assembly 104 to a transfer station 112 downstream of the cutting assembly 104. In the example illustrated, the transfer station 112 is located along the conveyor assembly 108.

Figures 2, 3:
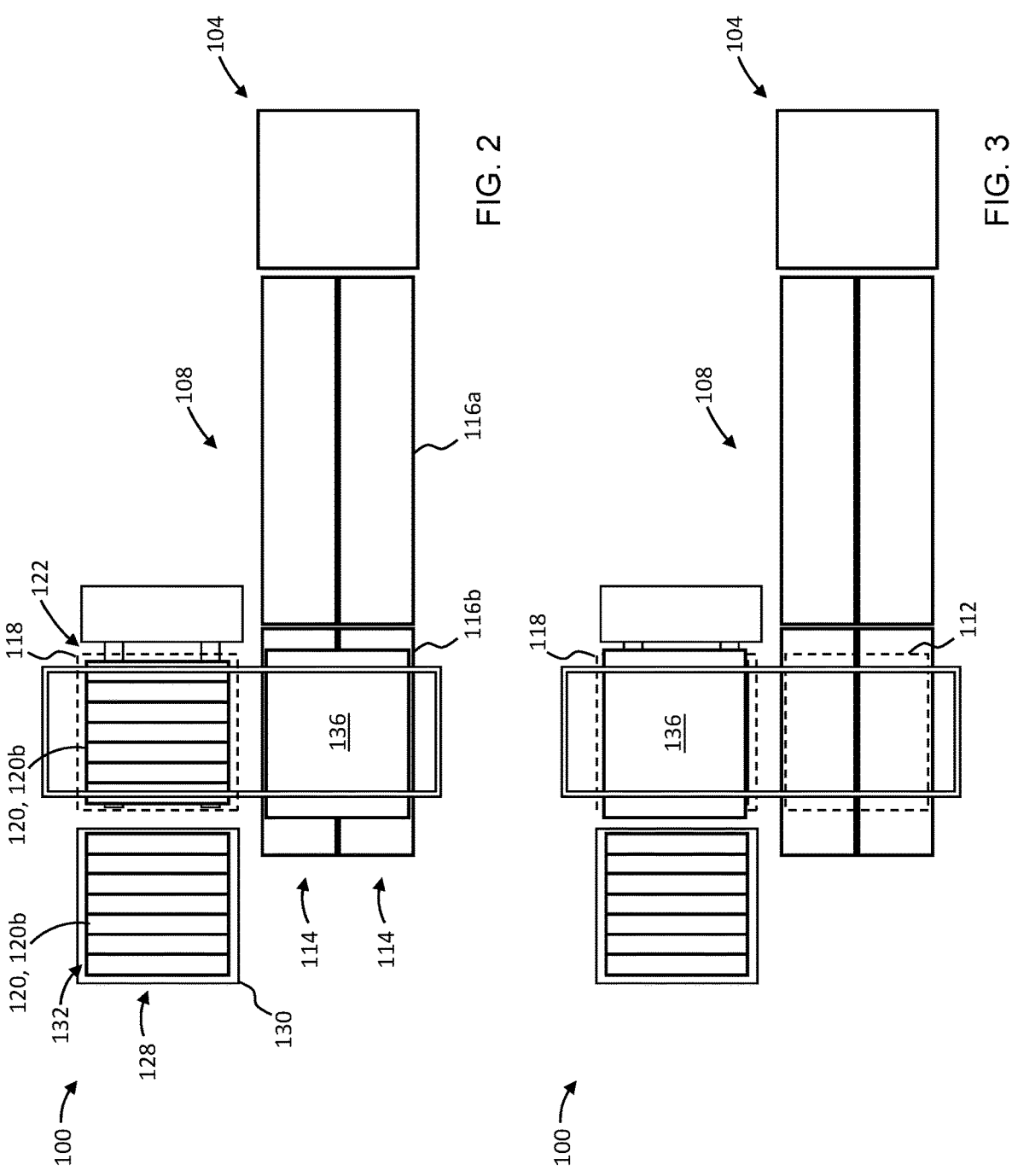
FIG. 2 is a schematic plan view of portions of the sod harvester of FIG. 1, showing a stacking head in a pick up position.
FIG. 3 is a schematic plan view like that of FIG. 2, but showing the stacking head in a drop off position.

Referring to FIG. 2, in the example illustrated, the conveyor assembly 108 includes a plurality of conveyor sets 114 (two conveyor sets 114, in the example illustrated) arranged side-by-side and in alignment with corresponding cutting heads and cut-off mechanisms of the cutting assembly 104 for receiving corresponding slabs from the cutting assembly 104, and transporting the corresponding slabs to the transfer station 112 (FIG. 3). In the example illustrated, each conveyor set 114 includes at least one first conveyor 116a and at least one second conveyor 116b downstream of the first conveyor 116a. In the example illustrated, the first conveyor 116a is inclined, and the second conveyor 116b is generally horizontal. The first conveyor 116a is operable to receive slabs 106 from the cutting assembly 104, and to transport the slabs 106 to the second conveyor 116b for presentation of the slabs at the transfer station 112, which is located on the second conveyors 116b in the example illustrated.

Referring to FIG. 2, in the example illustrated, the sod harvester 100 includes a pallet station 118 supported by the harvester frame 102 (FIG. 1) and spaced laterally apart from (and adjacent a side of) the transfer station 112 (FIG. 3). The pallet station 118 is operable to hold a pallet 120 for loading with slabs, and to discharge the loaded pallet 120 to the ground.

Figures 4, 5, 6:
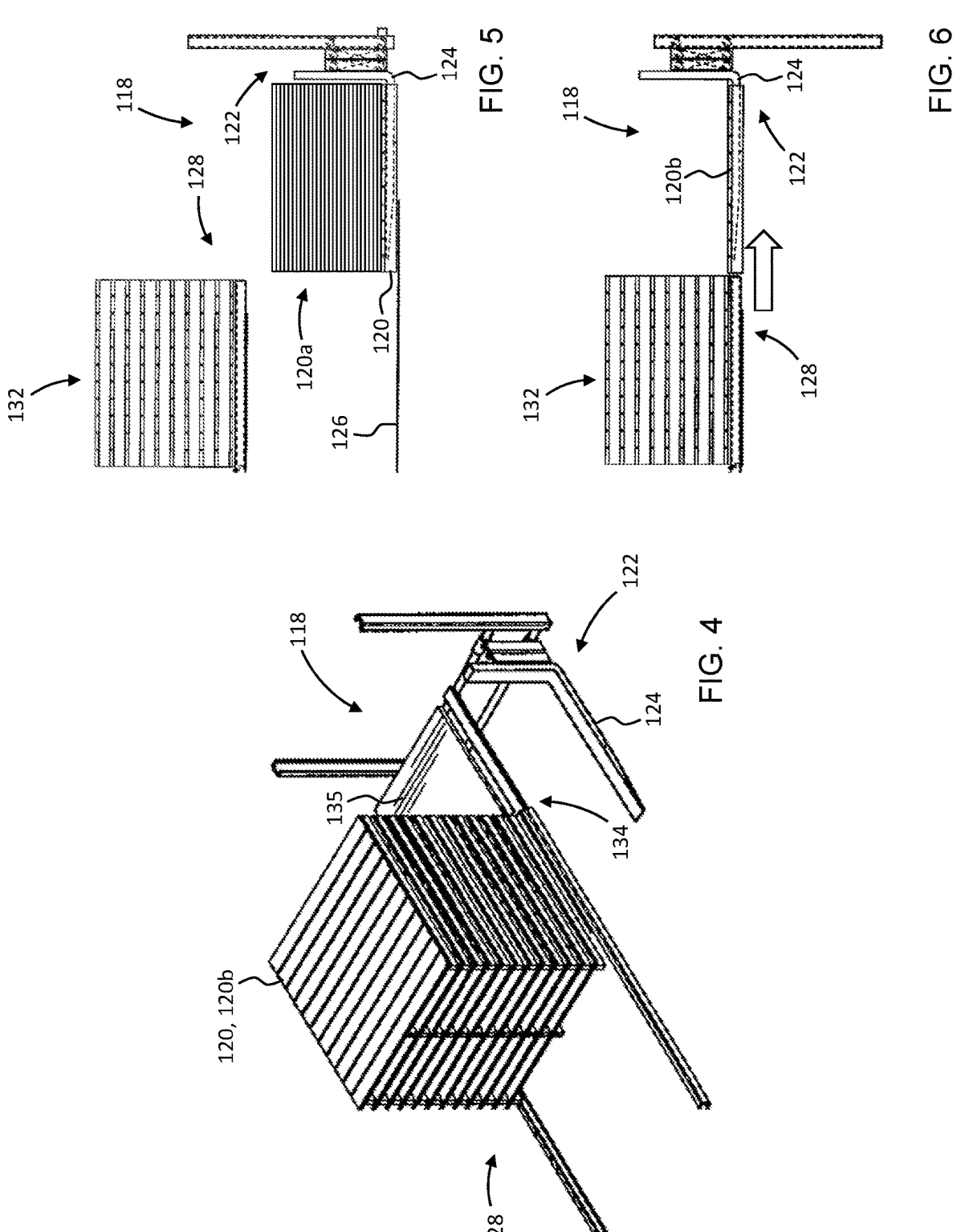
FIG. 4 is a perspective view of portions of a pallet station and pallet loader of the sod harvester of FIG. 1.
FIG. 5 is an elevation view of the pallet station and pallet loader of FIG. 4, showing forks of the pallet station lowered for discharge of a loaded pallet.
FIG. 6 is an elevation view like that of FIG. 5, but showing the forks raised for engagement with an empty pallet received from the pallet loader.

Referring to FIG. 4, in the example illustrated, the pallet station 118 comprises a forklift 122 having a plurality of forks 124 for holding a corresponding pallet 120 at the pallet station 118. The forks 124 project rearwardly (relative to the forward travel direction of the sod harvester) and are vertically translatable relative to the harvester frame 102 for raising and lowering the pallet 120 supported by the forks 124. Referring to FIG. 5, the forks 124 are translatable downwardly to lower a corresponding pallet 120 toward the ground incrementally as slab layers are stacked on the pallet 120. When the pallet 120 is sufficiently loaded with slab layers to form a loaded pallet 120a, the forklift 122 is operable to lower the loaded pallet 120a into engagement with the ground 126 to discharge the loaded pallet 120a rearwardly as the harvester 100 moves forward away from the loaded pallet 120a. Referring to FIG. 6, after discharge of the loaded pallet, the forks 124 are translatable upwardly away from the ground for receiving an empty pallet 120b (e.g. from a pallet loader as described below) for stacking of slabs on the pallet 120b.

Referring to FIG. 2, in the example illustrated, the sod harvester 100 includes a pallet loader 128 supported by the harvester frame adjacent the pallet station 118. The pallet loader 128 holds a plurality of empty pallets 120b and is operable to inject empty pallets 120b one by one to the pallet station 118 (e.g. during or after discharge of a loaded pallet from the pallet station 118). In the example illustrated, the pallet loader 128 comprises a pallet hopper 130 holding a stack 132 of empty pallets 120b, and a pallet injector 134 (FIG. 4) operable to transfer a bottom pallet 120b from the stack 132 of empty pallets 120b to the pallet station 118.

Referring to FIG. 4, in the example illustrated, the pallet injector 134 comprises an injector sheet 135 for supporting the bottom empty pallet 120b for transfer to the pallet station 118. The injector sheet 135 is translatable horizontally from a retracted position under the stack 132 and clear of the pallet station 118, to an advanced position (shown in FIG. 4) extending into the pallet station 118 for injection of the bottom empty pallet 120b into the pallet station 118 over the forks 124. In some examples, the injected pallet 120b can be temporarily supported at the pallet station 118 atop the injector sheet 135 (e.g. while the forks 124 are being raised into engagement with the pallet 120b) and receive a plurality of initial slab layers prior to engagement by the forks 124. In other examples, the pallet injector can comprise, for example, a push bar mechanism operable to push the bottom empty pallet 120b out from the hopper 130 directly onto the forks 124 when the forks 124 are in (or approaching) vertical alignment with the bottom pallet 120b.

Referring to FIG. 2, in the example illustrated, the sod harvester 100 includes a stacking head 136 movably mounted to the harvester frame 102 (FIG. 1). The stacking head 136 is moveable between a pick up position (FIG. 2) above the transfer station 112 for picking up one or more slabs from the transfer station 112, and a drop off position (FIG. 3) above the pallet station 118 for depositing the one or more slabs onto a pallet 120 at the pallet station 118. In the example illustrated, the stacking head 136 is translatable between the pick up and drop off positions through a gantry arrangement. In other examples, the stacking head 136 can be translatable between the pick up and drop off positions through a different mechanism, such as, for example, a robotic arm. In the example illustrated, the stacking head 136 is rotatable about a vertical axis to permit stacking of slab layers and/or slab stacks on the pallet at a 90 degree offset from adjacent slab layers and/or slab stacks on the pallet.

Figures 7, 8, 9:
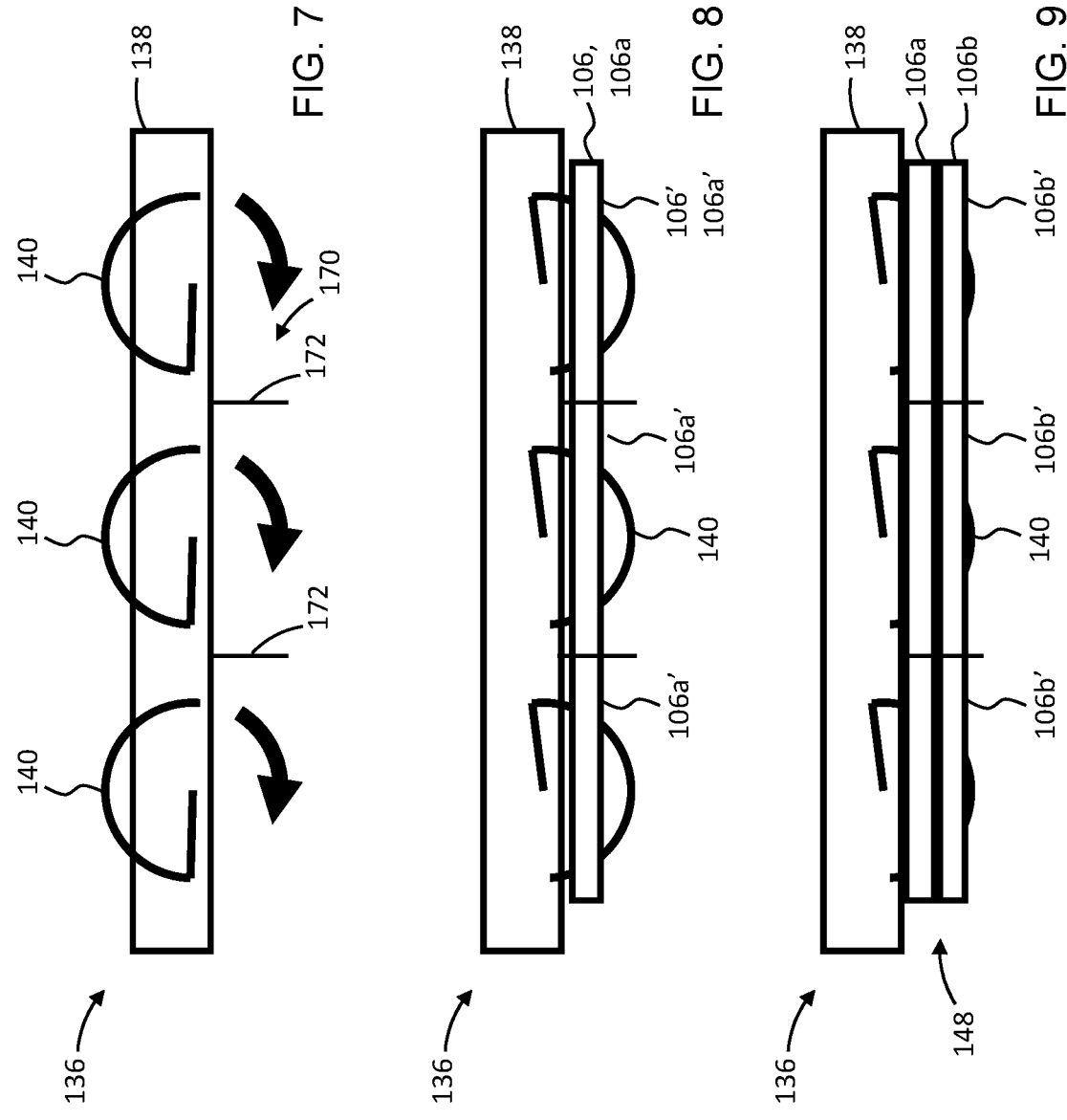
FIG. 7 is a schematic of a stacking head of the sod harvester of FIG. 1, showing hooks of the stacking head in a retracted configuration.
FIG. 8 is a schematic like that of FIG. 7, but showing the hooks in an advanced configuration and holding a single slab layer.
FIG. 9 is a schematic like that of FIG. 8, but showing the hooks holding a stack of slabs.

Referring to FIG. 7, in the example illustrated, the stacking head 136 includes a head frame 138 and a plurality of hooks 140 pivotably mounted to the head frame 138. In the example illustrated, the hooks 140 are pivotable relative to the head frame 138 between advanced and retracted positions. Referring to FIGS. 8 and 9, when in the advanced position, the hooks 140 project downwardly from an underside of the head frame 138 for engagement with and holding of one or more slabs 106 through piercing of the slabs 106 with the hooks 140. Referring to FIG. 7, when in the retracted position, the hooks 140 are generally withdrawn relative to the head frame 138 for releasing and depositing the slabs 106 held by the stacking head 136.

Referring to FIGS. 7 to 9, in the example illustrated, the stacking head 136 includes a cross-cut assembly 170 for cross cutting each initial slab 106 into a plurality of smaller slabs 106' (e.g. cross cutting each 24-inch by 48-inch slab 106 advanced to the transfer station into three 24-inch by 16-inch slabs 106', or in other examples, into two 24-inch by 24-inch slabs). In the example illustrated, the cross-cut assembly 170 includes a pair of laterally extending blade assemblies 172 fixed to the head frame 138 and spaced apart from each other along the conveyor assembly 108 (when the stacking head is in the pick up position) for cutting each slab 106 into a plurality of smaller slabs 106' when the slabs 106 are brought into engagement with the stacking head 136. In other examples, the cross-cut assembly 170 may be configured differently (e.g. for cutting each initial slab 106 into two slabs, or into a different number of slabs and/or to different dimensions as required).

Figures 14, 14A:
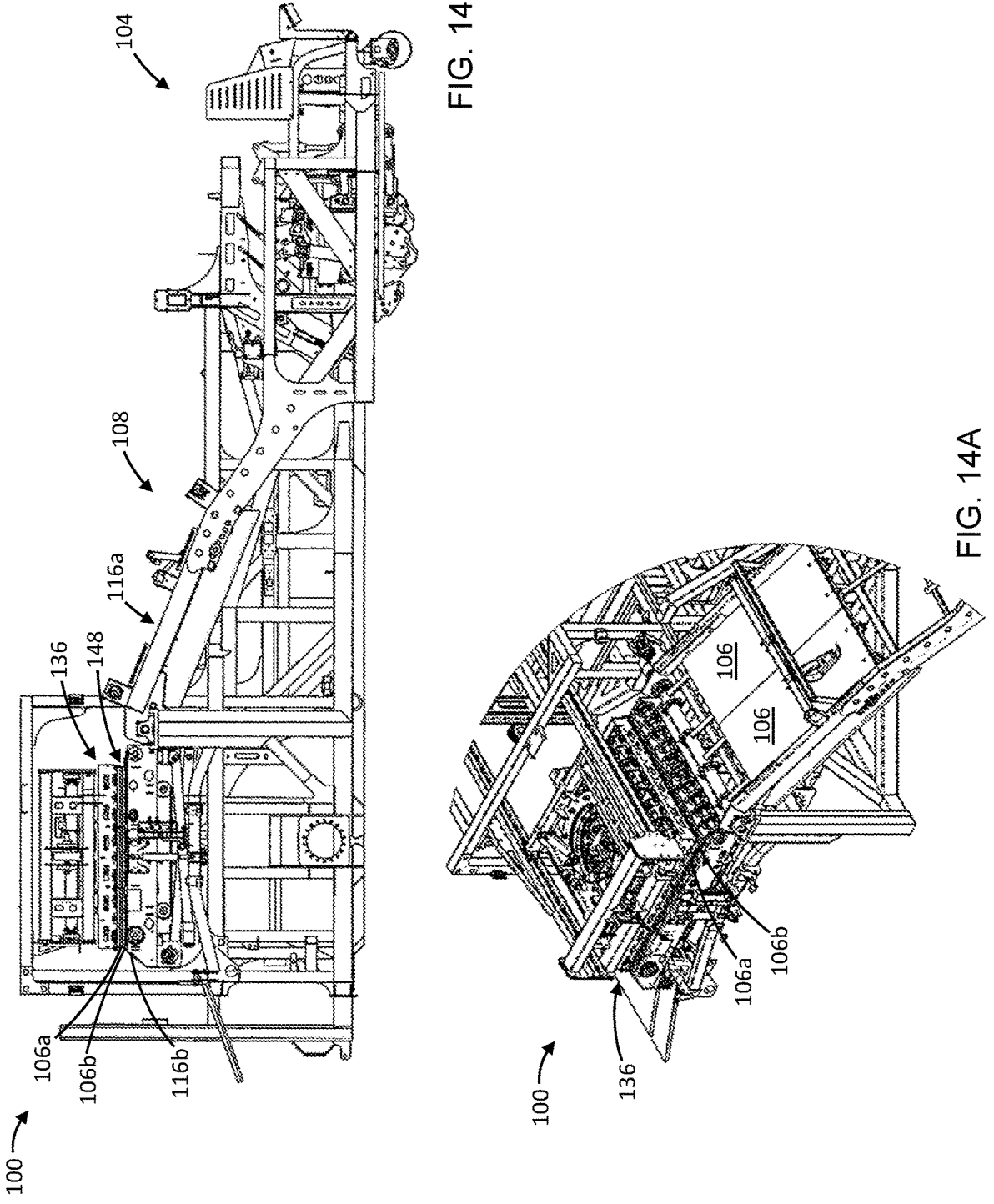

Referring to FIG. 1, in the example illustrated, the conveyor assembly 108 includes a slab lift 142 for lifting slabs 106 at the transfer station 112 toward the stacking head 136 for transfer thereto. In the example illustrated, the slab lift 142 is in the form of a scissor-style lift supported by the harvester frame 102 and operable to lift and lower the second (horizontal) conveyors 116b toward and away from the stacking head 136. When lowered, the input end of each second conveyor 116b is in generally vertical alignment with the output end of each corresponding first conveyor 116a for receiving slabs 106 from the first conveyor 116a. Referring to FIG. 14, when lifted, each second conveyor 116b is raised toward the stacking head 136 to an elevation above the output end of the first conveyor 116a for presenting the slabs 106 to the stacking head 136 (for pick up of the slabs 106 by the stacking head 136 through actuation of the hooks 140). In other examples, the second conveyors 116b may be vertically fixed relative to the harvester frame 102, and the stacking head 136 may be vertically translatable relative to the harvester frame 102 toward and away from the second conveyors 116b for pick up of the slabs 106 at the transfer station 112.

Figure 18:
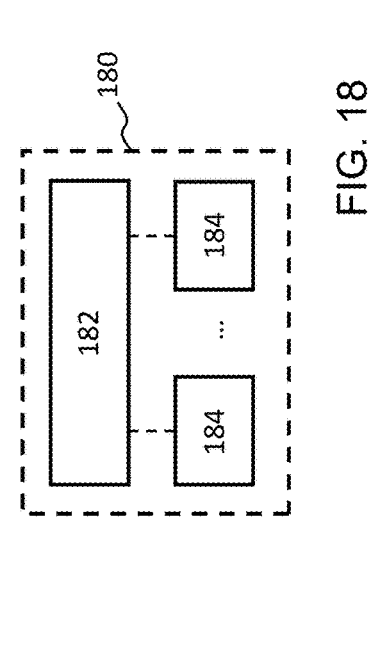
FIG. 18 is a schematic of a control system of the sod harvester of FIG. 1.

In the example illustrated, the sod harvester 100 includes a control system 180 (shown schematically in FIG. 18) having one or more controllers 182 and a plurality of sensors 184 in communication with the one or more controllers 182 for controlling and coordinating operation of the sod harvester 100 (including the cutting assembly 104, conveyor assembly 108, pallet station 118, pallet loader 128, stacking head 136, and other system components) to perform a continuous sod harvesting process as described herein.

Referring to FIGS. 1 and 1A, the sod harvesting process includes cutting sod slabs 106 from the ground using the cutting assembly 104. In the example illustrated, each slab 106 is cut to a width of approximately 24 inches and an initial length of approximately 48 inches. Referring to FIGS. 2 and 3, the slabs are advanced along the conveyor assembly 108 from the cutting assembly 104 to the transfer station 112. The slabs 106 at the transfer station 112 are picked up by the stacking head 136, transported to the pallet station 118, and deposited onto a pallet 120 at the pallet station 118. In the example illustrated, as the slabs are brought into engagement with the stacking head 136 (e.g. through lifting of the conveyors), each slab is cross cut into a plurality of smaller slabs 106' (FIG. 8; e.g. into three 24-inch by 16-inch slabs) through engagement with the cross-cut assembly 170 of the stacking head 136. The slab transfer process is continuously repeated for slabs advanced to the transfer station 112 to form a loaded pallet (see e.g. pallet 120a in FIG. 6) at the pallet station 118.

In some examples, during formation of the loaded pallet, the stacking head 136 can be operated in a single layer mode to transfer only a single layer of slabs 106 during each trip (or at least some trips) of the stacking head 136 from the transfer station 112 to the pallet station 118. Operating the stacking head in a single layer mode can be more efficient in some cases (e.g. outside of pallet replacement). In some examples, the stacking head 136 can transfer a stack of slabs 106 (i.e. two or more layers of slabs) during each trip of the stacking head 136 from the transfer station 112 to the pallet station 118, and/or may switch between transferring single layers and stacks of slabs 106 as may be suitable depending on operating conditions of the sod harvester 100.

Referring to FIGS. 5 and 6, after formation, the loaded pallet 120a is replaced with an empty pallet 120b. In the example illustrated, replacement of the loaded pallet 120a with the empty pallet 120b includes discharging the loaded pallet 120a from the pallet station 118 by lowering the forks 124 to bring the loaded pallet 120a into engagement with the ground 126, and moving the sod harvester 100 forward away from the loaded pallet 120a until the forks 124 are clear of the loaded pallet 120a. After the loaded pallet 120a is vertically clear of the pallet loader 128, an empty pallet 120b can be injected into the pallet station 118 from the stack 132 of empty pallets. After discharge of the loaded pallet 120a, the forks 124 are raised away from the ground for receiving the empty pallet 120b. In some examples, the empty pallet 120b can be received at the pallet station 118 for loading of initial layers of slabs prior to engagement by the forks 124 (e.g. while temporarily supported atop the injector sheet 135 (FIG. 4)).

During replacement of the loaded pallet 120a with the empty pallet 120b, the stacking head 136 is operated in a pre-stacking mode to form a stack 148 (FIG. 14) of the slabs 106 at the transfer station 112. This can help reduce idle time of the stacking head 136 and slowdown of the harvesting process (e.g. to avoid excessive accumulation of slabs 106 on the conveyor assembly 108) during pallet replacement.

Figures 10, 10A:
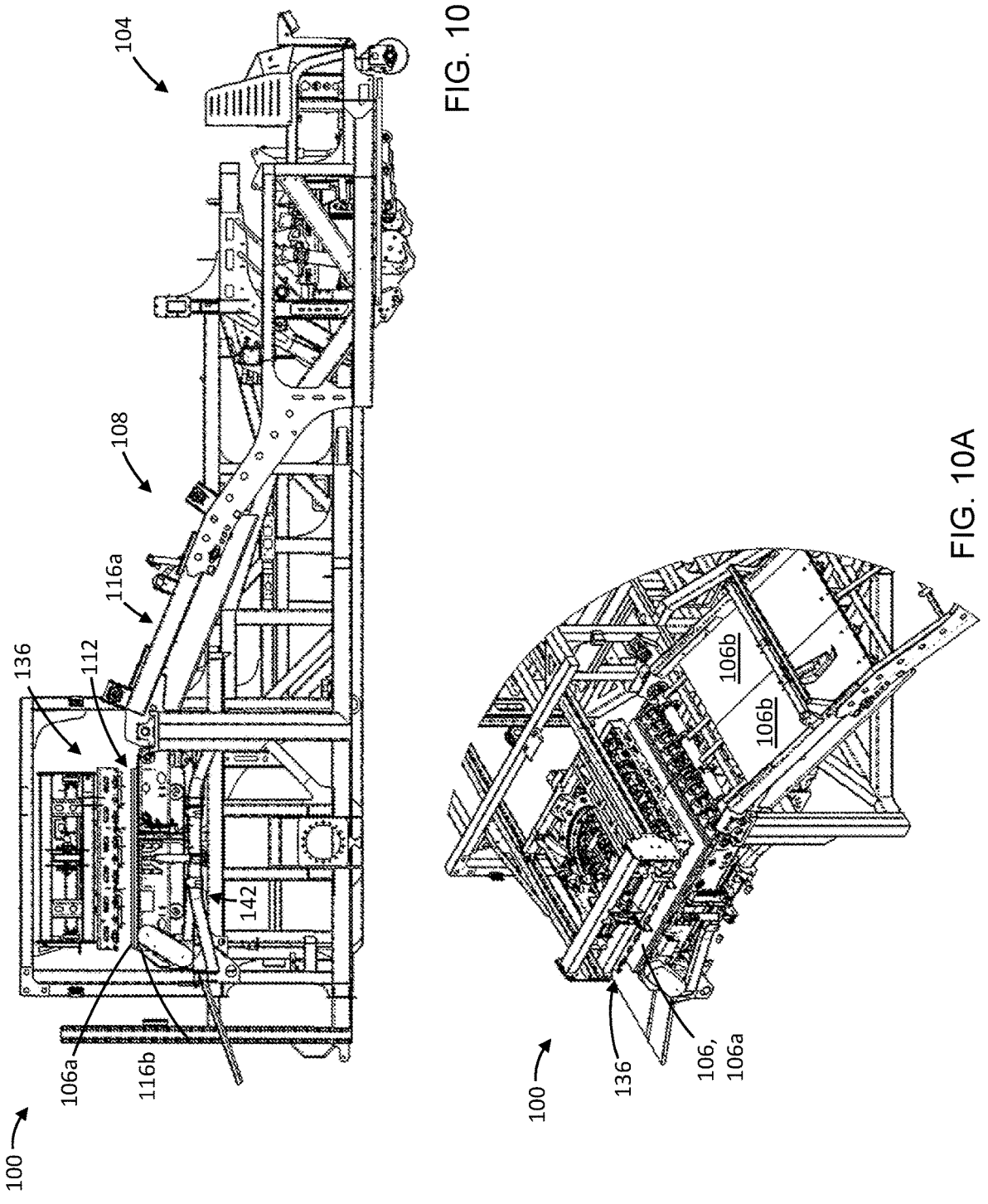
FIGS. 10-14A are elevation views like that of FIGS. 1 and 1A, showing the sod harvester at different stages of a slab pre-stacking process.
Figures 11, 11A:
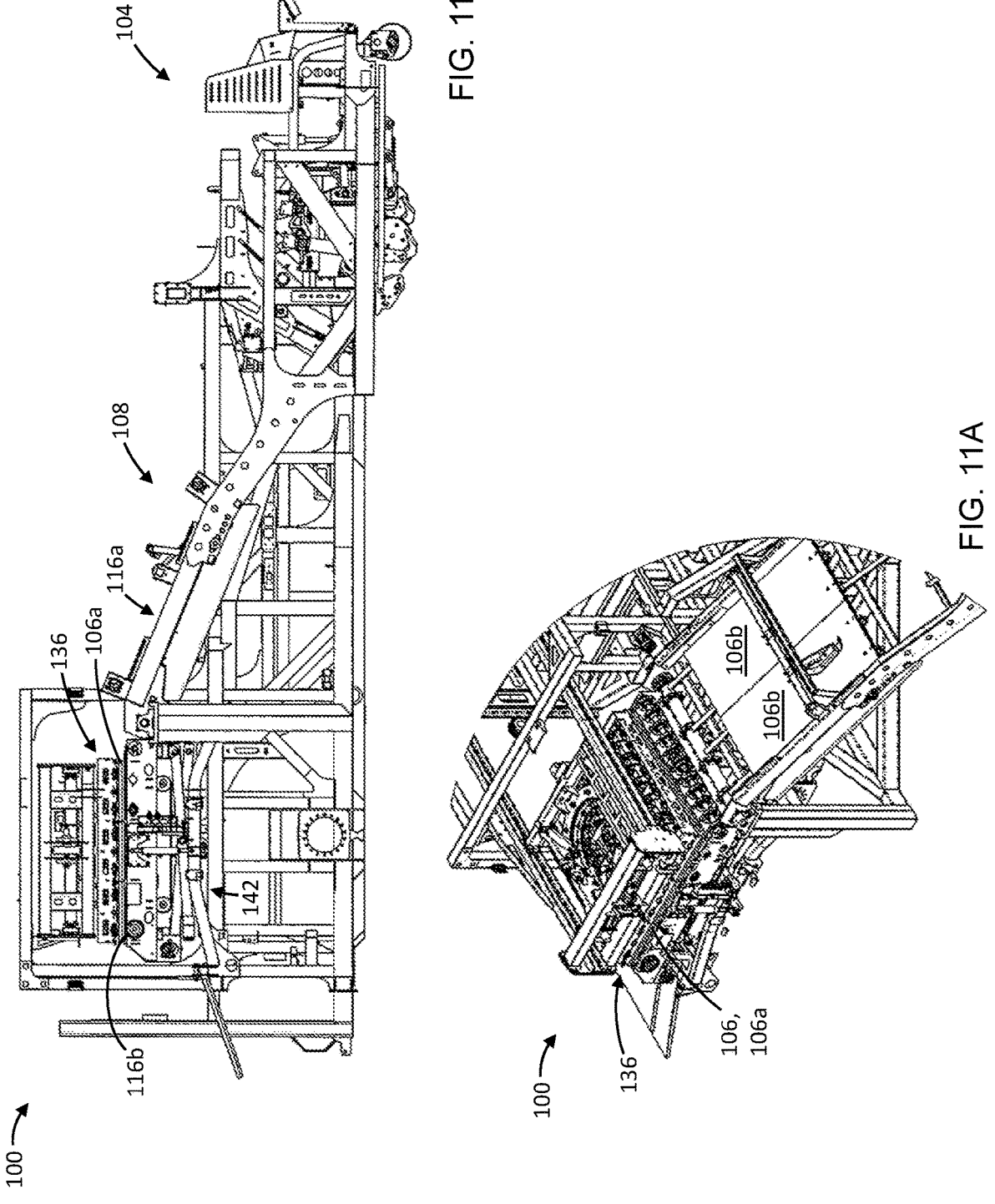

Referring to FIGS. 10 and 10A, in the example illustrated, forming the stack 148 includes advancing leading slabs 106a along the conveyor assembly 108 to the transfer station 112. Referring to FIGS. 11 and 11A, the second conveyors 116b supporting the leading slabs 106a at the transfer station 112 are lifted (e.g. through operation of the lift 142) toward the stacking head 136 for engagement of the leading slabs 106a by the stacking head 136. When lifted by the second conveyors 116b to the stacking head 136, the leading slabs 106a are brought into engagement with the cross-cut assembly 170 and cross-cut into a plurality of smaller trailing slabs 106a' (FIG. 9). After the second conveyors 116b are lifted, the stacking head 136 picks up the leading slabs 106a (e.g. by advancing the hooks 140 (FIG. 8)).

Figures 12, 12A:
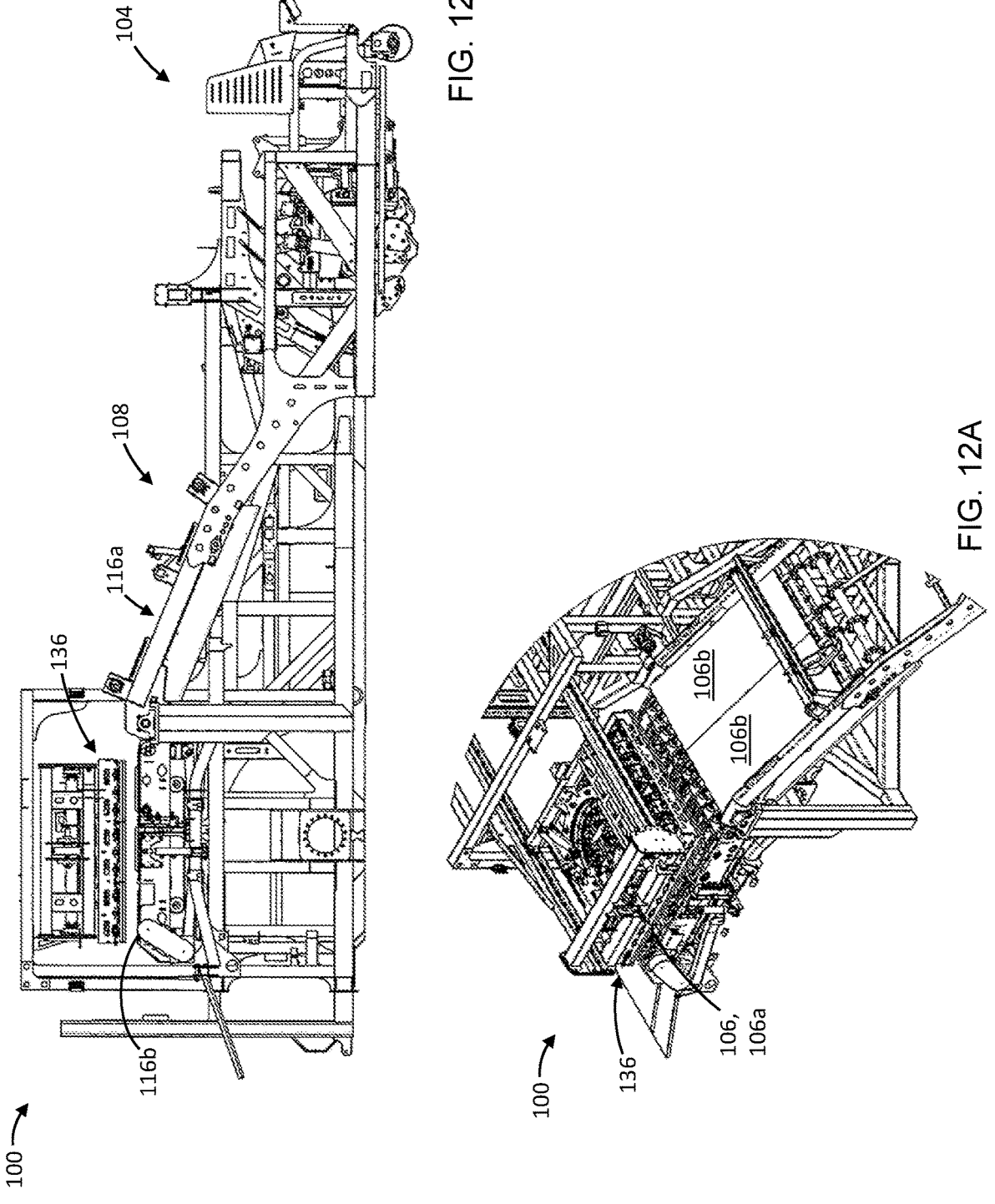
Figures 13, 13A:
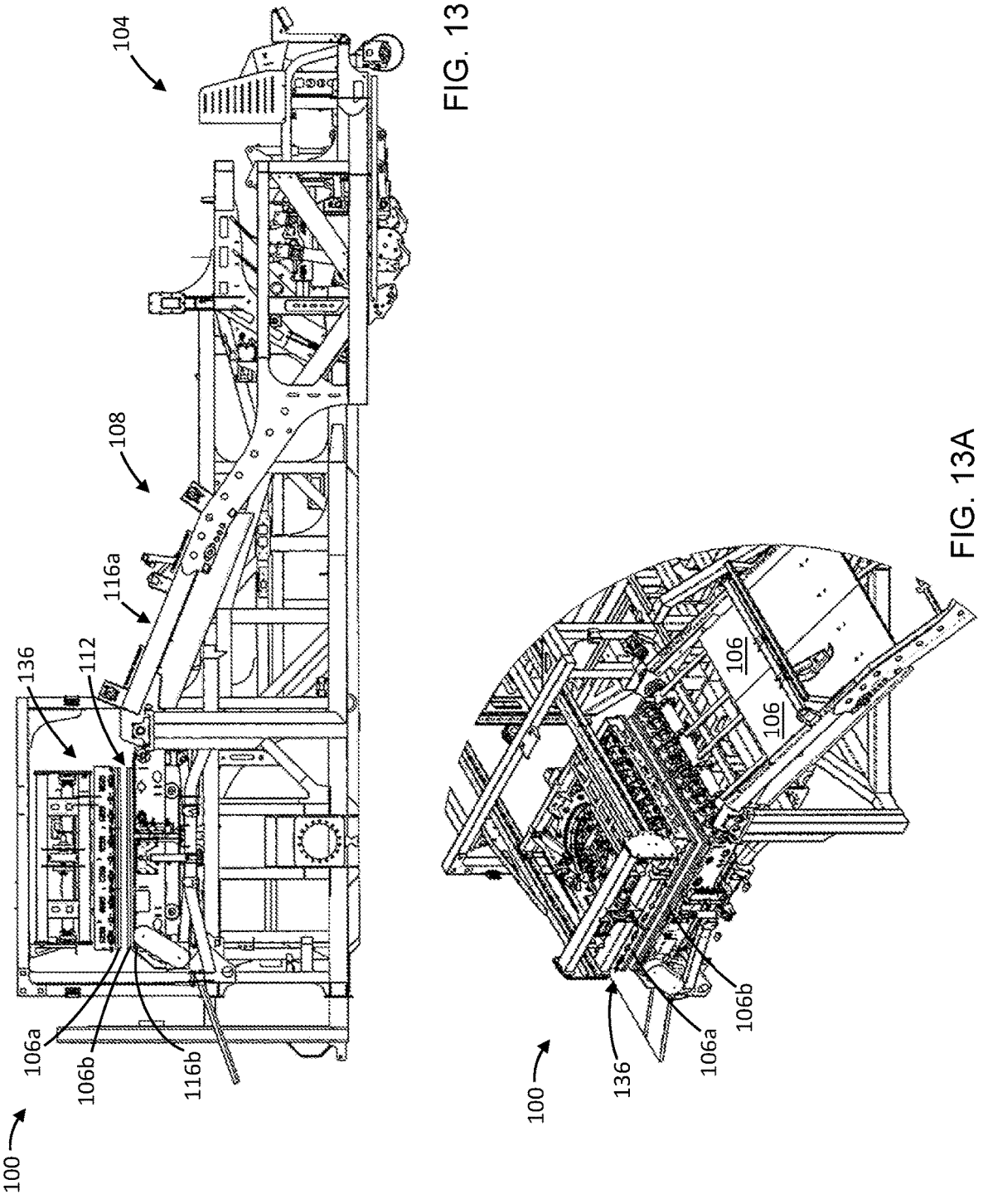

Referring to FIGS. 12 and 12A, the second conveyors 116b are then lowered away from the leading slabs 106a held by the stacking head 136. Referring to FIGS. 13 and 13A, after the second conveyors 116b are lowered, trailing slabs 106b are advanced along the conveyor assembly 108 to the transfer station 112 under the leading slabs 106a. The stacking head 136 can then release the leading slabs 106a to drop the leading slabs 106a onto the trailing slabs 106b (e.g. by withdrawing the hooks 140 (FIG. 8)) to form the stack 148.

In other examples, the second conveyors 116b can be lifted toward the stacking head 136 to raise the trailing slabs 106b toward an underside of the leading slabs 106a held by the stacking head 136. During or after raising of the trailing slabs 106b, the stacking head 136 can release the leading slabs 106a onto the trailing slabs 106b to form the stack 148.

Referring also to FIGS. 2 and 3, the stacking head 136 transfers the stack 148 to the pallet station 118 for deposit onto the empty pallet 120b (when received at the pallet station 118). In the example illustrated, the second conveyors 116b are lifted to raise the stack 148 toward the stacking head 136, and the stack 148 is picked up by the stacking head 136 (e.g. by advancing the hooks 140 (FIG. 9) through both the leading and trailing slabs 106a, 106b, which can comprise a plurality of smaller slabs 106a', 106b' as shown in FIG. 8). When the trailing slabs 106b are lifted to the stacking head 136 (either alone or as part of the stack 148), the trailing slabs 106b are brought into engagement with the cross-cut assembly 170 and cross-cut into a plurality of smaller trailing slabs 106b' (FIG. 9).

After the stack 148 is picked up, the second conveyor 116b can be lowered for receiving subsequent slabs. Transferring the stack 148 further includes translating the stacking head 136 while holding the stack 148 from the pick up position (FIG. 2) to the drop off position (FIG. 3), and releasing the stack 148 (e.g. by withdrawing the hooks 140 (FIG. 9)) onto the empty pallet 120b (when received at the pallet station 118). After depositing the stack 148 at the pallet station 118, the stacking head 136 can be switched back to operate in the single layer stacking mode, or can continue operating in the pre-stacking mode and/or switch between single layer and pre-stacking modes based on operating conditions. The stacking and pallet replacement process is then repeated.

Figure 15:
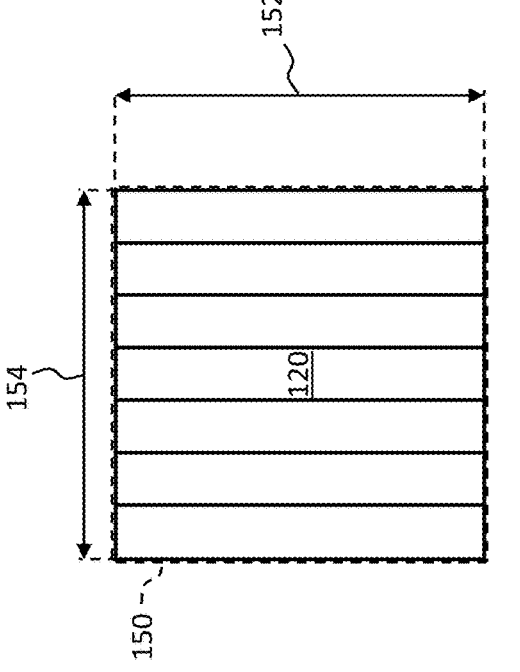
FIG. 15 is a schematic plan view of an example pallet for the sod harvester of FIG. 1.
Figure 16:
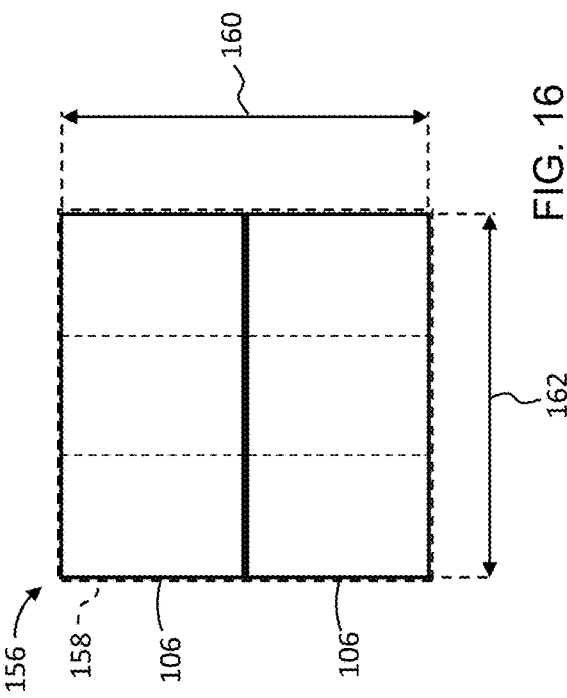
FIG. 16 is a schematic plan view of an example slab layer formed by the sod harvester of FIG. 1.

Referring to FIGS. 15 and 16, in the example illustrated, each pallet 120 has a pallet area 150 over which the slabs 106 are stackable. In the example illustrated, the pallet area 150 extends over the entire pallet 120, and the pallet area 150 is circumscribed and defined by a peripheral edge of the pallet 120. The pallet area 150 is defined by a pallet width 152 and a pallet length 154 extending perpendicular to the pallet width 152. Each of the pallet width 152 and the pallet length 154 can be between about, for example, 35 inches and 50 inches. In the example illustrated, the pallets 120 are standard North American pallets, and each of the pallet width 152 and the pallet length 154 is about 48 inches.

In the example illustrated, the stacking head 136 (FIG. 14) is configured to stack and transfer slab layers 156 having a slab layer area 158 corresponding in size (e.g. approximately equal to) to the pallet area 150. This can allow for stacking of at least one complete slab layer 156 over the pallet area 150 during each trip of the stacking head 136 (FIG. 14) from the transfer station to the pallet station (and at least two complete slab layers 156 over the pallet area 150 during transfer of each slab stack 148 (FIG. 14) by the stacking head from the transfer station to the pallet station). The slab layer area 158 is defined by a slab layer width 160 and a slab layer length 162. Each of the slab layer width 160 and the slab layer length 162 can be, for example, between 35 and 50 inches, for stacking of at least one complete slab layer over the pallet area 150 during each trip of the stacking head from the transfer station to the pallet station. In the example illustrated, the slab layer width 160 and the slab layer length 162 are generally equal to each other, and each of the slab layer width 160 and the slab layer length 162 is about 48 inches for stacking over a 48-inch by 48-inch pallet area.

Figure 17:
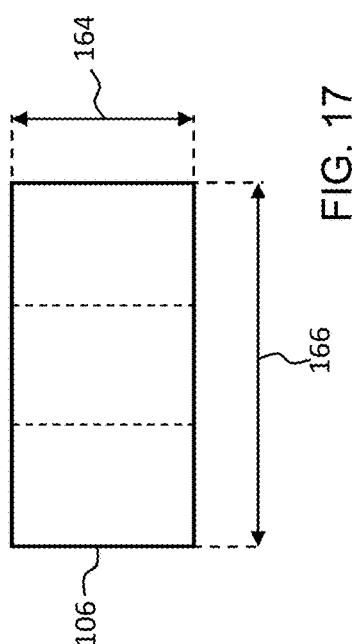
FIG. 17 is a schematic plan view of an example sod slab formed by the sod harvester of FIG. 1.

In the example illustrated, each slab layer 156 is defined by two of the initial slabs 106 positioned side by side (and optionally cross cut into a plurality of smaller slabs 106') to form the slab layer area 158. Referring to FIG. 17, in the example illustrated, each slab 106 has a slab width 164 and an initial slab length 166. The slab length 166 can be between, for example, 44 and 52 inches and the slab width 164 can be between, for example, 22 and 26 inches. In the example illustrated, the slab length 166 is about 48 inches and the slab width 164 is about 24 inches to provide a slab layer area 158 of about 48 inches by 48 inches.

In other examples, each slab layer can be defined by a different number of initial slabs positioned side by side. For example, in some examples, each slab layer can be defined by three initial slabs positioned side by side to form the slab layer area. In such examples, each initial slab can have a slab width of between about, for example, 14 and 18 inches (e.g. about 16 inches), and an initial slab length of between about, for example, 44 and 52 inches (e.g. about 48 inches, for forming two smaller 16-inch by 24-inch slabs, or three smaller 16-inch by 16-inch slabs when subsequently cross cut by the stacking head).

In other examples, the pallets can have different dimensions. In some examples, the pallets can be CHEP pallets having a pallet area of about, for example, 1200 mm by 1000 mm (about 47 inches by 37 inches), and the slab layer area can correspond in size to this pallet area.

In other examples, the pallets can have a pallet area of about, for example, 46 inches by 46 inches, and the slab layer area can correspond in size to this pallet area. In such examples, the initial slab length can be between about, for example, 42 inches and 50 inches (e.g. about 46 inches). The slab width can be between, for example, 22 and 26 inches (e.g. about 24 inches) for two slabs side by side, or between about, for example, 14 and 18 inches (e.g. about 16 inches) for three slabs side by side.

The invention claimed is:

1. A method of operating a sod harvester, comprising:
  a) cutting sod slabs from the ground using a cutting assembly including one or more cutting heads;
  b) advancing the slabs along one or more conveyors of a conveyor assembly from the one or more cutting heads to a transfer station located along the one or more conveyors;

c) repeatedly transferring the slabs from the transfer station to a pallet station spaced apart from the transfer station using a stacking head to form a loaded pallet at the pallet station;

d) replacing the loaded pallet at the pallet station with an empty pallet;

e) during the replacing step, operating the stacking head in a pre-stacking mode for forming a stack of the slabs at the transfer station with the stacking head;

f) transferring the stack of slabs using the stacking head from the transfer station to the pallet station to deposit the stack onto the empty pallet when received at the pallet station; and g) repeating (a) to (g) in a continuous sod harvesting process.

2. The method of claim 1, wherein (c) includes operating the stacking head in a single layer mode to transfer a single layer of one or more slabs during at least some of the trips of the stacking head from the transfer station to the pallet station.

3. The method of claim 1, wherein the replacing step includes discharging the loaded pallet from the pallet station onto the ground and injecting the empty pallet from a pallet loader to the pallet station.

4. The method of claim 1, wherein forming the stack includes holding a leading slab above the conveyor assembly using the stacking head, advancing a trailing slab along the conveyor assembly under the leading slab, and positioning the leading slab atop the trailing slab.

5. The method of claim 4, wherein forming the stack includes lifting a conveyor of the one or more conveyors supporting the leading slab at the transfer station toward the stacking head and picking up the leading slab from the conveyor using the stacking head.

6. The method of claim 5, wherein forming the stack includes lowering the conveyor away from the leading slab when picked up by the stacking head and advancing the trailing slab along the conveyor under the leading slab.

7. The method of claim 6, wherein forming the stack includes releasing the leading slab onto the trailing slab.

8. The method of claim 7, wherein releasing the leading slab includes withdrawing hooks of the stacking head from the leading slab.

9. The method of claim 7, wherein transferring the stack includes picking up the stack from the transfer station by the stacking head, transporting the stack from the transfer station to the pallet station through translation of the stacking head, and depositing the stack at the pallet station.

10. The method of claim 9, wherein the conveyor is lifted toward the stacking head to raise the stack for pick up by the stacking head.

11. The method of claim 9, wherein picking up the stack includes advancing hooks of the stacking head through both the leading and trailing slabs and depositing the stack includes withdrawing the hooks from both the leading and trailing slabs.

12. The method of claim 1, wherein the stacking head transfers at least one complete slab layer in each trip of the stacking head from the transfer station to the pallet station.

13. The method of claim 1, wherein each pallet has a pallet area over which slabs are stackable, and each slab layer transferred from the transfer station to the pallet station by the stacking head has a slab layer area corresponding in size to the pallet area for stacking at least one complete slab layer over the pallet area during each trip of the stacking head from the transfer station to the pallet station.

14. The method of claim 13, wherein the pallet area is defined by a pallet width and a pallet length, and wherein each of the pallet width and the pallet length is between about 35 inches and 50 inches, and wherein the slab layer area is defined by a slab layer width and a slab layer length, and wherein each of the slab layer width and the slab layer length is between about 35 inches and 50 inches.

15. A sod harvesting system, comprising:

a) a harvester frame;

b) a cutting assembly mounted to the harvester frame for cutting sod into slabs, the cutting assembly including one or more cutting heads;

c) a conveyor assembly including one or more conveyors supported by the harvester frame for transporting the slabs away from the cutting assembly toward a transfer station located along the one or more conveyors;

d) a pallet station supported by the harvester frame and spaced apart from the transfer station, the pallet station operable to hold a pallet for loading with slabs and to discharge the pallet when loaded;

e) a pallet loader supported by the harvester frame for holding a plurality of empty pallets, the pallet loader operable to inject empty pallets one at a time to the pallet station;

f) a stacking head movably mounted to the harvester frame, the stacking head moveable between a pick up position above the transfer station for picking up one or more slabs from the transfer station, and a drop off position above the pallet station for depositing the one or more slabs on a pallet at the pallet station; and g) a control system including one or more controllers configured to control operation of the stacking head to:

i) repeatedly transfer slabs from the transfer station to the pallet station to form a loaded pallet at the pallet station;

ii) during replacement of the loaded pallet with an empty pallet, operate the stacking head in a pre-stacking mode for forming a stack of slabs at the transfer station; and iii) transfer the stack of slabs from the transfer station to the pallet station for deposit on the empty pallet when received at the pallet station, and repeat (i) to (iii) in a continuous sod harvesting process.

16. The sod harvesting system of claim 15, wherein the one or more controllers are further configured to: operate the stacking head in a single layer mode for transferring a single layer of one or more slabs during at least some of the trips of the stacking head from the transfer station to the pallet station in (i).

17. A method of operating a stacking head of a sod harvester, comprising:

a) operating the stacking head in a single layer mode, in which the stacking head transfers a single layer of one or more sod slabs during each trip from a transfer station located along one or more conveyors of a conveyor assembly to a pallet station for deposit of the single layer onto a pallet at the pallet station; and b) switching operation of the stacking head from the single layer mode to a pre-stacking mode, the stacking head forming a stack of slabs at the transfer station and transferring the stack to the pallet station when operating in the pre-stacking mode.

18. The method of claim 17, further comprising loading the pallet with the stacking head operating in the single layer mode to form a loaded pallet, replacing the loaded pallet with an empty pallet, and operating the stacking head in the pre-stacking mode to deposit the stack of slabs onto the empty pallet.

19. The method of claim 18, further comprising switching from the pre-stacking mode back to the single layer mode after transfer of the stack onto the empty pallet to form another loaded pallet in a continuous sod harvesting process.

20. The method of claim 17, wherein operation of the stacking head is switched between the single layer mode and the pre-stacking mode during a continuous sod harvesting process.

21. A method of operating a sod harvester, comprising:

a) cutting sod slabs from the ground using a cutting head;

b) advancing the slabs along one or more conveyors from the cutting head to a transfer station located along the one or more conveyors;

c) forming a stack of the slabs at the transfer station using a stacking head; and d) transferring the stack of slabs using the stacking head from the transfer station to a pallet station to deposit the stack onto a pallet at the pallet station.

22. The method of claim 21, wherein forming the stack includes holding a leading slab above the one or more conveyors using the stacking head, advancing a trailing slab along the one or more conveyors under the leading slab, and positioning the leading slab atop the trailing slab.

23. The method of claim 22, wherein forming the stack includes lifting a conveyor of the one or more conveyors supporting the leading slab at the transfer station toward the stacking head for pick up of the leading slab by the stacking head, lowering the conveyor away from the leading slab held by the stacking head to advance the trailing slab along the conveyor under the leading slab, and releasing the leading slab onto the trailing slab.

24. The method of claim 22, wherein forming the stack includes advancing hooks of the stacking head through the leading slab to pick up the leading slab, and withdrawing the hooks from the leading slab to release the leading slab onto the trailing slab, and wherein transferring the stack includes advancing the hooks through both the leading and trailing slabs at the transfer station, transporting the stack to the pallet station using the stacking head, and withdrawing the hooks from the leading and trailing slabs at the pallet station.

25. The method of claim 21, wherein each stack includes at least two complete slab layers for stacking on the pallet.

26. The method of claim 21, wherein each pallet has a pallet area over which slabs are stackable, and each slab layer in the stack has a slab layer area corresponding in size to the pallet area for stacking at least two complete slab layers over the pallet area during transfer of each stack by the stacking head from the transfer station to the pallet station.

27. The method of claim 26, wherein the pallet area is defined by a pallet width and a pallet length, and wherein each of the pallet width and the pallet length is between about 35 inches and 50 inches, and wherein the slab layer area is defined by a slab layer width and a slab layer length, and wherein each of the slab layer width and the slab layer length is between about 35 inches and 50 inches.

* * * * *